(12) United States Patent
Ito et al.

(10) Patent No.: US 6,598,101 B1
(45) Date of Patent: Jul. 22, 2003

(54) RECORDING APPARATUS AND RECORDING METHOD, AND REPRODUCING APPARATUS AND REPRODUCING METHOD

(75) Inventors: Norikazu Ito, Kanagawa (JP); Satoshi Yoneya, Kanagawa (JP); Masakazu Yoshimoto, Kanagawa (JP); Satoshi Katsuo, Kanagawa (JP); Jun Yoshikawa, Kanagawa (JP); Shouji Nakamura, Kanagawa (JP); Tomohisa Shiga, Kanagawa (JP); Masaki Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/538,436

(22) Filed: Mar. 29, 2000

(30) Foreign Application Priority Data

Mar. 29, 1999 (JP) .......................... 11-085219

(51) Int. Cl.[7] .............................. G06F 13/00
(52) U.S. Cl. .................. 710/68; 386/124; 386/125; 386/109; 386/112; 386/27
(58) Field of Search .................. 711/111; 712/112; 386/124, 125, 27, 109, 112; 710/68, 74

(56) References Cited

U.S. PATENT DOCUMENTS

| | | | | |
|---|---|---|---|---|
| 5,652,857 A | * | 7/1997 | Shimoi et al. | 711/113 |
| 5,923,817 A | * | 7/1999 | Nakamura | 386/124 |
| 5,974,223 A | * | 10/1999 | Uchide | 386/109 |
| 6,064,795 A | * | 5/2000 | Uchide | 386/112 |
| 6,456,783 B1 | * | 9/2002 | Ando et al. | 386/125 |
| 6,504,994 B2 | * | 1/2003 | Kawamura et al. | 386/95 |
| 6,522,833 B1 | * | 2/2003 | Ando et al. | 386/125 |

* cited by examiner

Primary Examiner—Jeffrey Gaffin
Assistant Examiner—Mike Nguyen
(74) Attorney, Agent, or Firm—Frommer Lawrence & Haug LLP; William S. Frommer; Stephen J. Lieb

(57) ABSTRACT

There is provided an AV server system with high operationality for a simple use. A file system is not provided in an AV server, and AV data are continuously recorded or reproduced from a place (sector) of a random-accessible HD where a magnetic head is positioned.

19 Claims, 11 Drawing Sheets

POSITION OF HEAD 14A (SECTOR #4400)

FIG. 10A
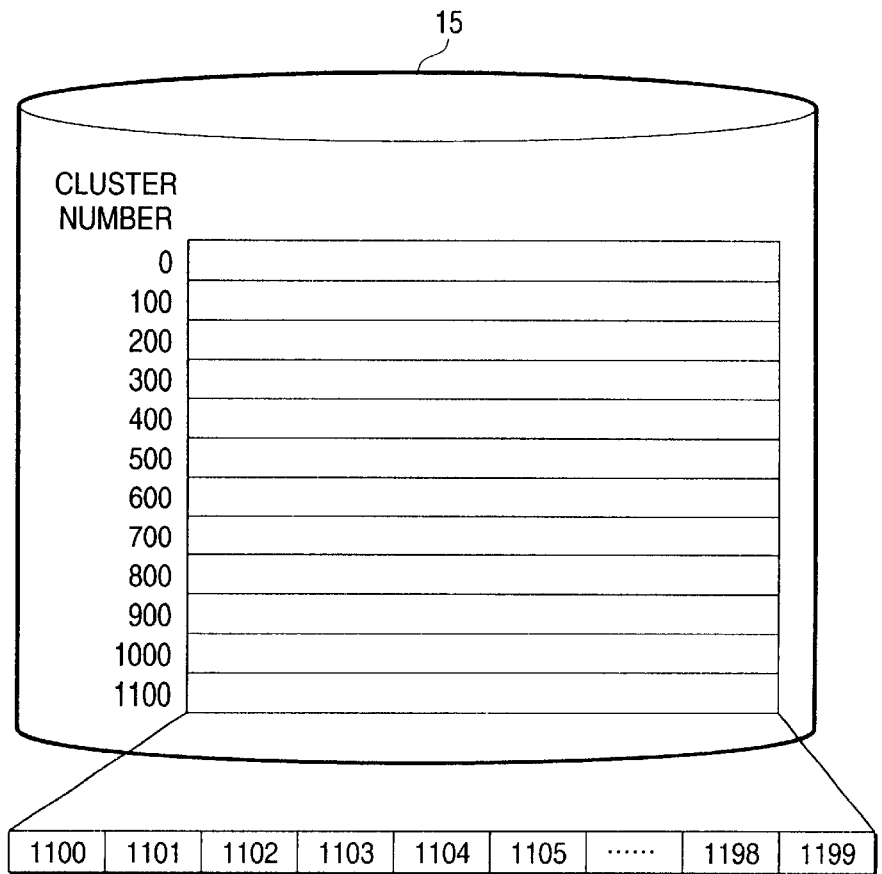
FIG. 10B
FIG. 10C
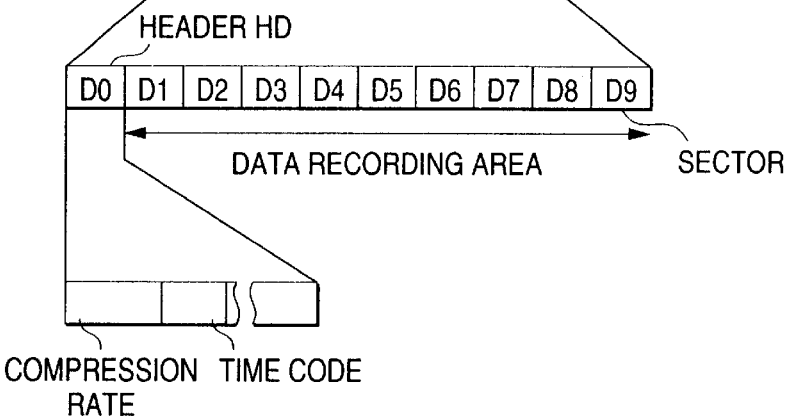

RECORDING APPARATUS AND RECORDING METHOD, AND REPRODUCING APPARATUS AND REPRODUCING METHOD

BACKGROUND OF THE INVENTION

1. Field of the Invention

The present invention relates to a recording apparatus and a recording method, and a reproducing apparatus and a reproducing method, and particularly to a recording apparatus and a recording method, and a reproducing apparatus and a reproducing method, which make it possible to provide a system suitable for a simple use in, for example an AV (Audio Visual) server which records and reproduces image data.

2. Description of the Prior Art

In recent years, with the increase of channels of information supply due to the spread of a CATV (Cable Television) or the like, differently from a conventional VTR (Video Tape Recorder), a request to reproduce a plurality of images and audio data (hereinafter suitably referred to as AV (Audio Visual) data) at the same time has been increasing. In order to satisfy this request, an AV server (or video server) using a random-accessible recording medium such as a HD (Hard Disk) and suitable for recording and reproduction of a plurality of (plural channels) AV data becomes popular. In the VTR, since a tape-like recording medium is used, recording and reproduction of AV data are performed linearly in a sense. On the other hand, in the AV server, since a random-accessible recording medium is used, recording and reproduction of the AV data can be performed nonlinearly in a sense.

Since the AV server uses the random-accessible HD, it is possible to quickly perform such editing as to join AV data recorded on separate clusters in a recording area on the HD. Besides, by providing a number of input output processors in the AV server, it can easily meet a request to realize a multichannel system in which a number of users use it at the same time. Moreover, in recent years, through a RAID (Redundant Arrays of Inexpensive Disks) technique in which a plurality of HDs are arranged in parallel so that a data transfer rate is increased and recording capacity is made large, it has become possible to deal with a large amount of AV data. Thus, the AV server can also be used as an archive (storage place of a large amount of AV data).

However, when a single user uses the AV server, or even in the case of multiple users, when the number of users is merely several, it is less required to manage files by the same file system as a computer as above mentioned.

Moreover, for example, in the case where a live relay of an artist or a relay of a sport such as baseball or soccer is performed, its broadcast is performed and further, recording for a replay is performed. However, since AV data recorded for the replay become unnecessary when the broadcast is ended, when the AV server system is used for recording for such a replay, there is a case where the AV server system performing complicated file management, such as a file system, is contrary hard to operate.

That is, in the AV server system in which management of files is carried out through the same file system as a computer, it is necessary to specify a file name when AV data are recorded or reproduced. Thus, for example, a user using an upper application 1 such as an editing apparatus is required to perform the operation while being conscious of the existence of files, and for example, there is a case where it is hard for the user familiar with the operation of a VTR to operate the system.

Moreover, since to have the file system requires to perform processing for management thereof, the software for operating the AV server becomes complicated by that, and the apparatus becomes large and expensive.

Besides, in the case of realizing so-called multiple rates in which the AV data are recorded at different compression rates, the software for managing the file system becomes more complicated.

Further, if the file system is lost (if the file management information is destroyed), it becomes difficult to reproduce the AV data recorded in the HD, and in the case where the AV server is used for a broadcast, a terrible influence is exerted on the broadcast.

SUMMARY OF THE INVENTION

The present invention has been made in view of such circumstances, and an object thereof is to provide an AV server suitable for a simple use.

A recording apparatus of the invention comprises recording means for recording data on a random-accessible recording medium, and control means for controlling the recording means so that the data are continuously recorded from a place of a recording area on the recording medium, where the recording means is positioned.

A recording method of the invention comprises a step of controlling recording means for recording data on a random-accessible recording medium so that the data are continuously recorded from a place where the recording means is positioned.

A reproducing apparatus of the invention comprises reproducing means for reproducing data recorded on a random-accessible recording medium, and control means for controlling the reproducing means so that the data are continuously reproduced from a place of a recording area on the recording medium, where the reproducing means is positioned.

A reproducing method of the invention comprises a step of controlling reproducing means for reproducing data recorded on a random-accessible recording medium so that the data are continuously reproduced from a place where the reproducing means is positioned.

According to the recording apparatus and the recording method of the invention, the recording means is controlled so that the data are continuously recorded from the place where the recording means for recording the data on the random-accessible recording medium is positioned.

According to the reproducing apparatus and the reproducing method of the invention, the reproducing means is controlled so that the data are continuously reproduced from the place where the reproducing means for reproducing the data recorded on the random-accessible recording medium is positioned.

BRIEF DESCRIPTION OF THE DRAWINGS

FIGS. 10A to 10C are views showing a format of a cluster of the HD 15 in the case where recording and reproduction of AV data is performed at multiple rates.

DETAILED DESCRIPTION OF THE PREFERRED EMBODIMENTS

Figure 1:
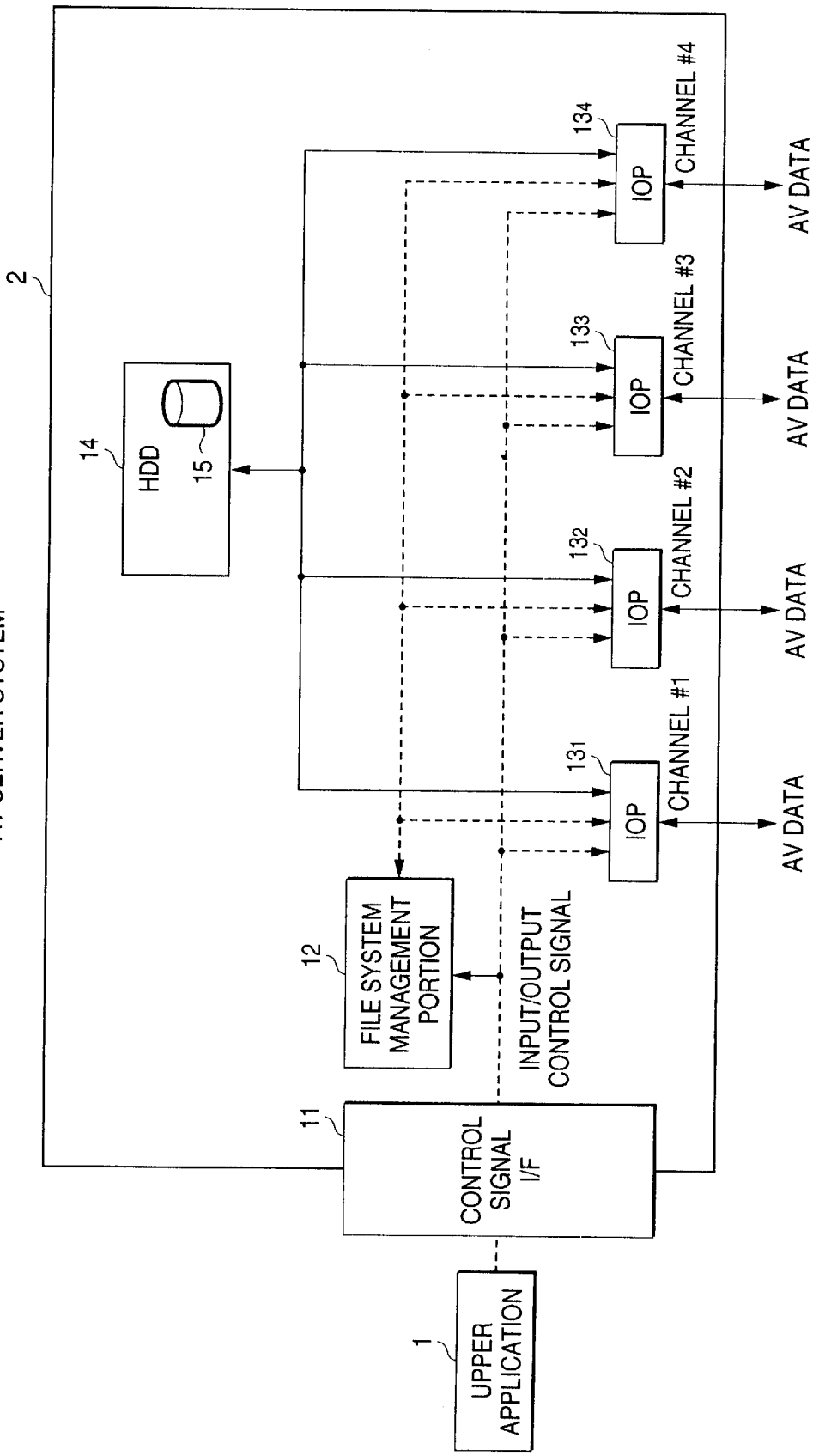
FIG. 1 is a block diagram showing a structure of an example of a conventional AV server system.

FIG. 1 shows a structure of an example of an AV server system using an AV server.

In FIG. 1, the AV server system is composed of a higher rank application (upper application) 1, for example, an editing apparatus or the like, and an AV server 2.

The upper application 1 includes a user interface, for examples a key board, a pointing device, a jog dial, or a shuttle ring, and a control signal to instruct recording, reproduction, editing, or the like of AV data is outputted from the upper application 1 in accordance with the operation of a user. This control signal is received by a control signal I/F (Interface) 11 of the AV server 2, and is supplied to 1OPS (Input Output Processor) 131 to 134.

When receiving, for example, a control signal to instruct recording of AV data, the IOP 13$i$ (here, i=1, 2, 3, 4) requests a file system management portion 12 to record the AV data. The file system management portion 12 is designed to perform management of files, in which AV data are recorded, in a built-in HD 15 of a HDD (HD Drive) 14. When receiving the request to record the AV data from the IOP 13$i$, the file system management system portion 12 secures a free space where a file as the AV data is recorded, and further, prepares file management information for managing the file, and indicates a sector (or cluster) where the AV data are recorded to the IOP 13$i$. The IOP 13$i$ carries out necessary processing, for example, compression or data conversion, to the AV data to be inputted there and to be recorded, and further, outputs the AV data to the HDD 14 on the basis of the indication of the file system management portion 12, and makes the built-in HD 15 record the data.

Besides, when receiving, for example, a control signal to instruct reproduction of AV data, the IOP 13$i$ requests the file system management portion 12 to reproduce the AV data. The file system management portion 12 recognizes a sector (cluster) where the AV data as a file requested by the IOP 13$i$ to reproduce are recorded, and supplies it to the IOP 13$i$. On the basis of the information from the file system management portion 12, the IOP 13$i$ reads out the file as the AV data to be reproduced, which is recorded in the HD 15 of the HDD 14, and carries out necessary processing, such as expansion or data conversion, to the AV data and outputs it.

Figure 2:
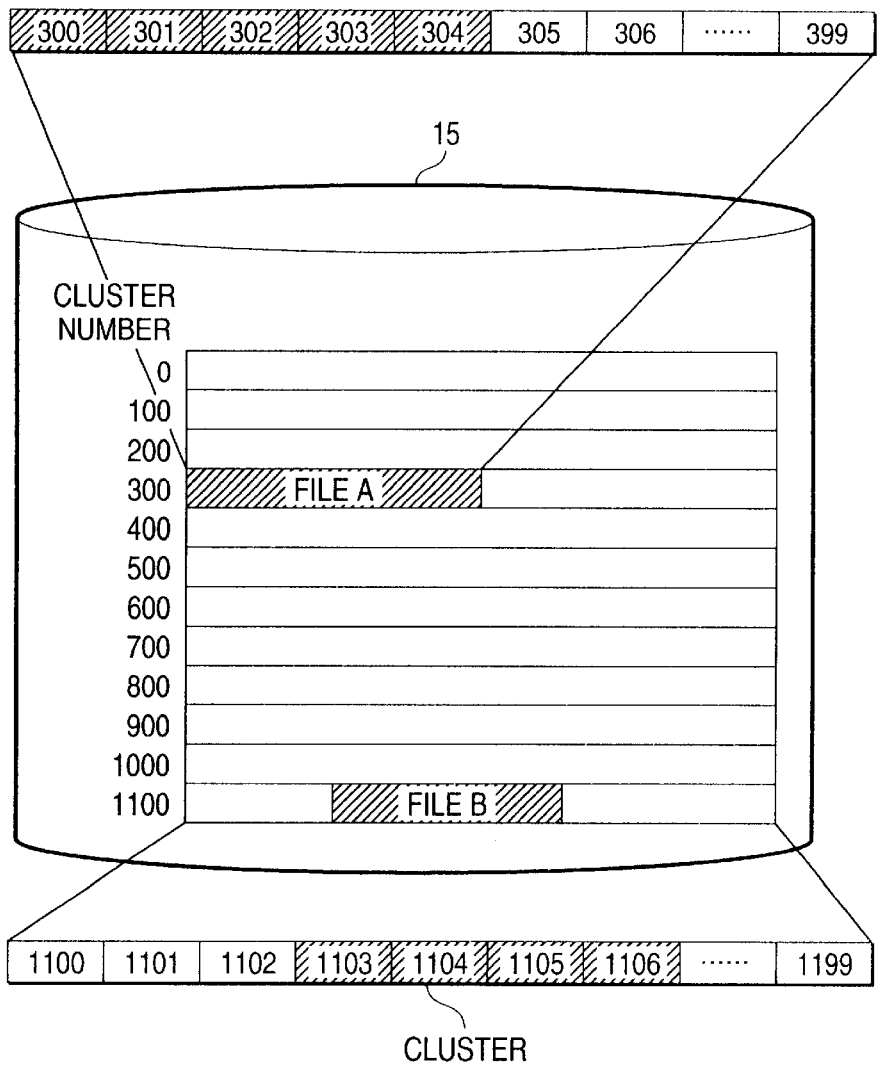
FIG. 2 is a view for explaining a management method of files by a file system management portion 12 of FIG. 1.

Next, a management method of files recorded in the HD 15 by the file system management portion 12 will be described with reference to FIG. 2.

Now, for example, it is assumed that the HD 15 is composed of 12000 sectors, and respective clusters are composed of 10 sectors from the head sector. Here, the cluster number of a j-th cluster from the head of the HD 15 is made j-1, and a cluster with a cluster number j will be hereinafter suitably referred to as a cluster #j.

In FIG. 2A, two files, "File A" and "File B", are recorded in the HD 15. That is, AV data as the file "File A" are recorded in the range of 5 clusters of clusters #300 to #304 at, for example, a rate of 3 sector/frame, and AV data as the file "File B" are recorded in the range of 4 clusters of clusters #1103 to #1106 at, for example, a rate of 5 sector/frame.

In this case, in the file system management portion 12, file management information as shown in FIG. 2B is prepared and managed for the file "File A", and file management information as shown in FIG. 2C is prepared and managed for the file "File B".

Here, according to the file management information of FIG. 2B, with respect to the file "File A", it is possible to recognize that 1 is attached as a file number (File No) as a unique number attached to the file, and that the file name (File name) is File A. Further, it is possible to recognize that the rate (compression rate) of the AV data of the file "File A" is 3 sector/frame, and the record start position (Start cluster) is cluster #300. Further, it is possible to recognize that the size of cluster (Cluster size) where the AV data of the file "File A" are recorded is 5 clusters. Thus, reproduction of the file "File A" can be performed by reading out the range of 5 clusters from the cluster #300 to the cluster #304.

On the other hand, according to the file management information of FIG. 2C, with respect to the file "File B", it is possible to recognize that 2 is attached as a file number (File No) as a unique number attached to the file, and the file name (File name) is File B. Further, it is possible to recognize that the rate of the AV data of the file "File B" is 5 sector/frame, and the record start position (Start cluster) is cluster #1103. Further, it is possible to recognize that the size of cluster (Cluster size) where the AV data of the file "File B" are recorded is 4 clusters. Thus, reproduction of the file "File B" can be performed by reading out the range of 4 clusters from the cluster #1103 to the cluster #1106.

Incidentally, in FIGS. 2A to 2C, although the AV data of both the file "File A" and "File B" are recorded over continuous clusters of the HD 15, there is also a case where data of a file are recorded over separate clusters. In this case, as the file management information, the cluster number of a head cluster in a recording area where the AV data are next recorded, and the size (here, for example, the number of clusters) of the recording area are also prepared.

Next, record processing for recording a file of AV data, which is preformed in the AV server system of FIG. 1, will be described with reference to a flowchart of FIG. 3.

In the record processing, first of all, at step S1, the upper application 1 specifies a file name of a file of AV data to be recorded and its file size in response to the operation of a user, and makes a request of recording to the IOP 13$i$. This request of recording, the file name, and the file size are transferred to the file system management portion 12, and the file system management portion 12 opens a file at step S2 in response to the request of recording from the IOP 13$i$. That is, at step S2, in the file system management portion 12, a free space with a size according to the request from the IOP 13i is secured on the HD 15, and file management information as explained in FIG. 2B or FIG. 2C is prepared and is stored. Then, this file management information is supplied to the IOP 13i.

In the IOP 13i, at step S3, on the basis of the file management information from the file management portion 12, a cluster of the HD 15 in which the AV data are to be recorded is recognized, the processing proceeds to step S4, the AV data are recorded in the recognized cluster of the HD 15, and the record processing is ended.

Next, reproduction procession for reproducing a file recorded in the manner as described above will be described with reference to a flowchart of FIG. 4.

In the reproduction processing, first of all, at step S11, the upper application 1 specifies a file name of a file to be reproduced, and a reproduction start position, for example, a time code in response to the operation of a user, and requests the IOP 13i to cue up (CUEUP). At step S12, the IOP 13i requests the file system management portion 12 to open the file to be reproduced, the processing proceeds to step S13, and file management information of the file requested to be opened is searched in the file system management portion 12, and is transmitted to the IOP 13i.

In the IOP 13i, at step S14, a cluster from which reproduction starts is calculated on the basis of the file management information from the file system management portion 12. That is, at step S14, on the basis of Rate and Start cluster (FIG. 2B and FIG. 2C) of the file management information, the cluster of the HD 15 corresponding to the time code from the upper application 1 is obtained. Then, the processing proceeds to step S15, the IOP 13i reads out the AV data from the cluster, and at step S16, the AV data are outputted and the reproduction processing is ended.

Here, the AV server 2 of FIG. 1 includes four IOPs 131 to 134, and these IOPs 131 to 134 have the HDD 14 in common. Thus, it is necessary for the respective IOPs 131 to 134 to access the HDD 14 so that butting (contention) does not occur. Thus, with respect to each of the IOPs 131 to 134, access to the HDD 14 is given in time-sharing and periodically. Here, like this, the AV server which includes a plurality of IOPs and can perform input/output of AV data of a plurality of channels at the same time, is called a multichannel AV server. Thus, the AV server 2 of FIG. 1 is a multichannel AV server of 4 channels.

Figure 5:
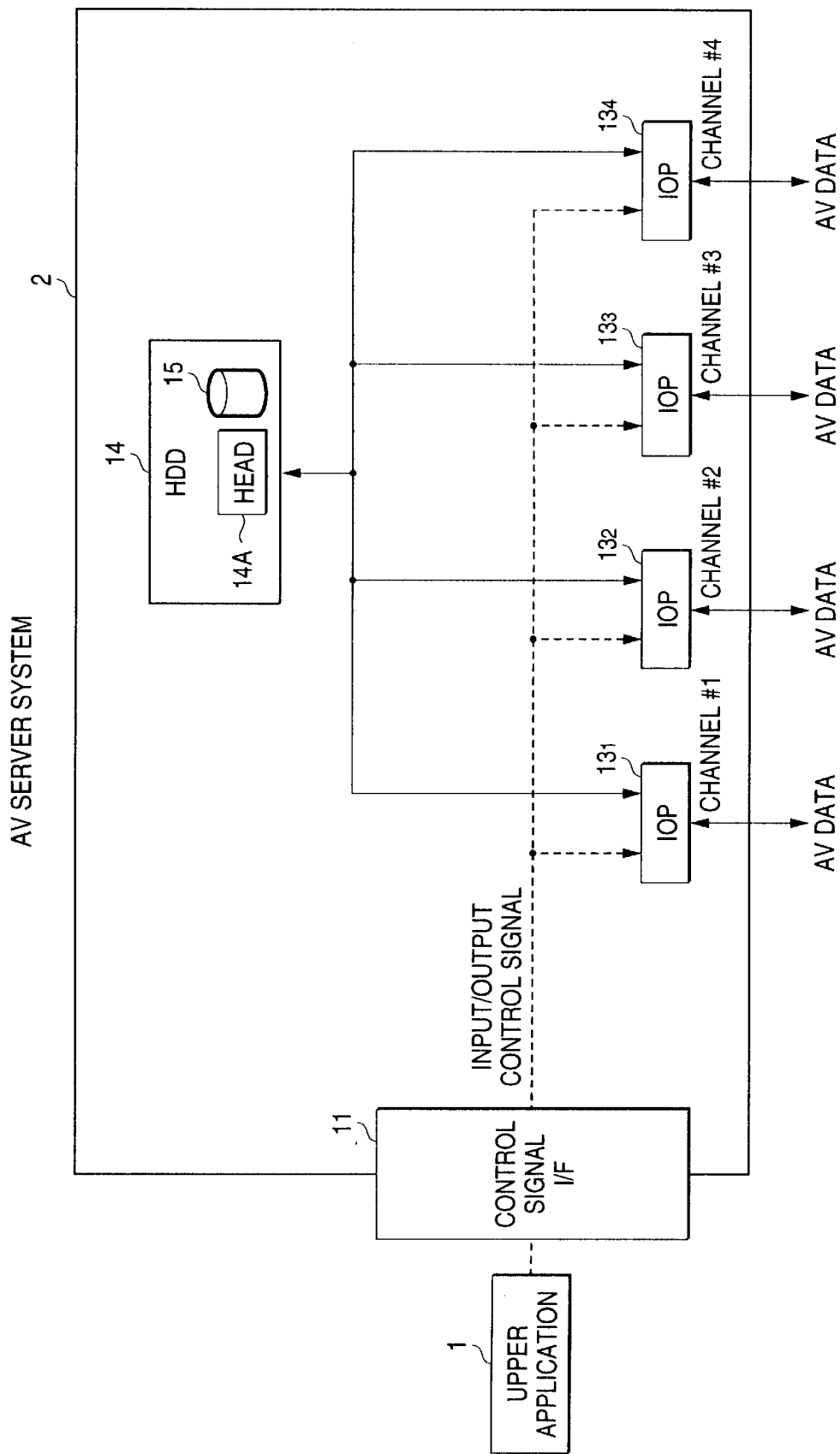
FIG. 5 is a block diagram showing a structural example of an embodiment of an AV server system to which the invention is applied.

FIG. 5 shows a structural example of an embodiment of an AV server system to which the invention is applied. In the drawing, portions corresponding to those of FIG. 1 are designated by the same characters, and their description will be suitably omitted. That is, the AV server system of FIG. 5 is structured basically in the same manner as the AV server system of FIG. 1 except that the file system management portion 12 is eliminated. Thus, the AV server 2 constituting the AV server system of FIG. 5 is a multichannel AV server of 4 channels, and does not include a file system. Incidentally, although not shown in FIG. 1, a magnetic head 14A of the HDD 14 for recording and reproducing AV data to and from the HD 15 is shown in FIG. 5.

In the AV server system constructed as described above, recording and reproduction of the AV data is continuously performed from a sector where the magnetic head 14A of the HDD 14 for recording and reproducing the AV data is positioned to the HD 15.

Figure 6:
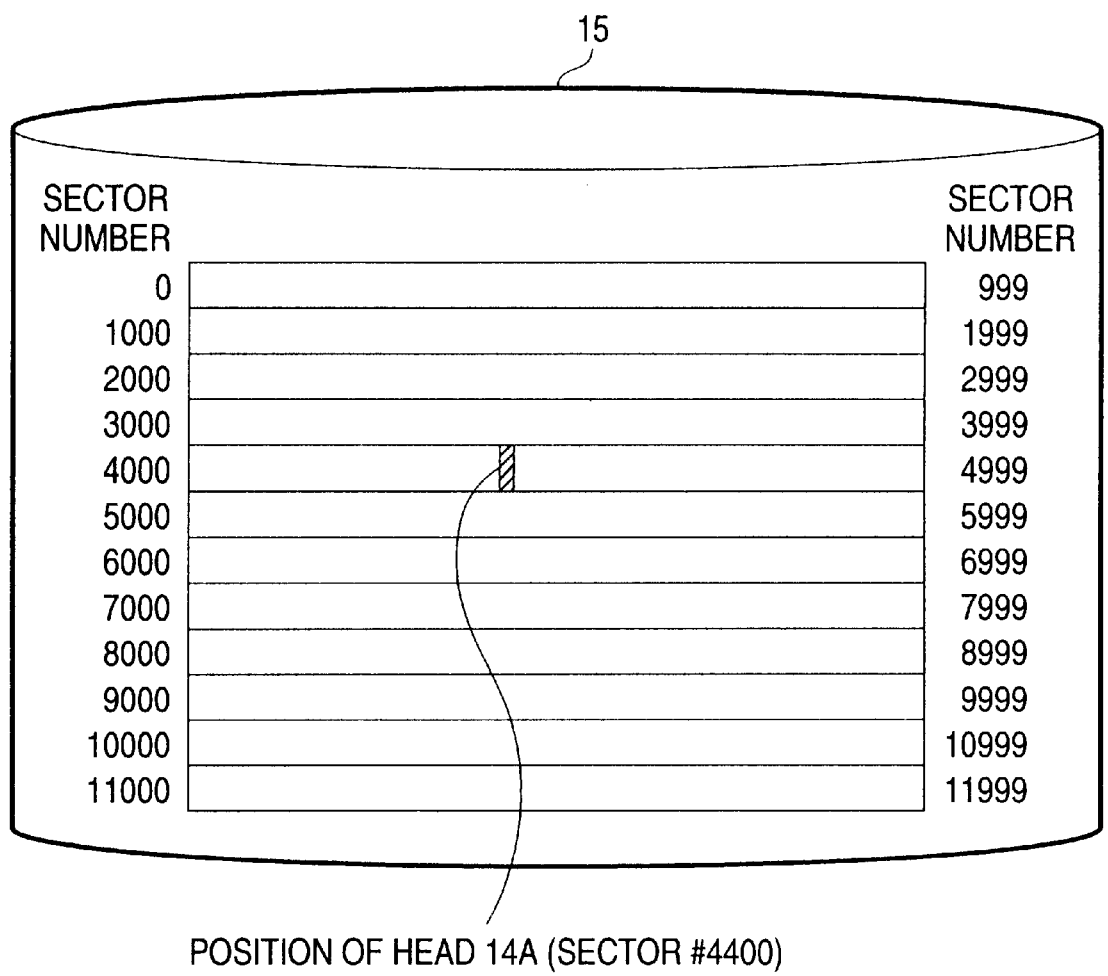
FIG. 6 is a view for explaining the way in which AV data is recorded and reproduced in the AV server system of FIG. 5.

That is, now, in the HD 15 having the same structure as the case shown in FIGS. 2A to 2C, as shown in FIG. 6, it is assumed that the magnetic head 14A of the HDD 14 is positioned, for example, at a sector #4400 (sector with a sector address of 4400). In this case, when recording or reproduction of AV data is instructed from the upper application 1, the IOP 13i continuously performs recording or reproduction of the AV data from the sector #4400 where the magnetic head 14A is positioned to a sector #4401, #4402, . . . , until the stop is instructed.

Besides, when the IOP 13i receives an instruction of rewinding or fast-forwarding from the upper application 1, it causes the magnetic head 14A of the HDD 14 to sequentially move to a sector of a former sector address or a later sector address.

Thus, in this case, the recording area of the HD 15 can be regarded as, so to speak, a linear recording area like one video tape, and a user can operate the upper application 1 in the same feeling as the operation of a VTR. Further, in this case, when the upper application 1 is structured by a simple controller or the like having an operation portion, such as a jog dial or a shuttle ring, it becomes possible to construct an AV system having high operationality in a simple use such as a broadcast of a relay of sports or the like.

Figure 7:
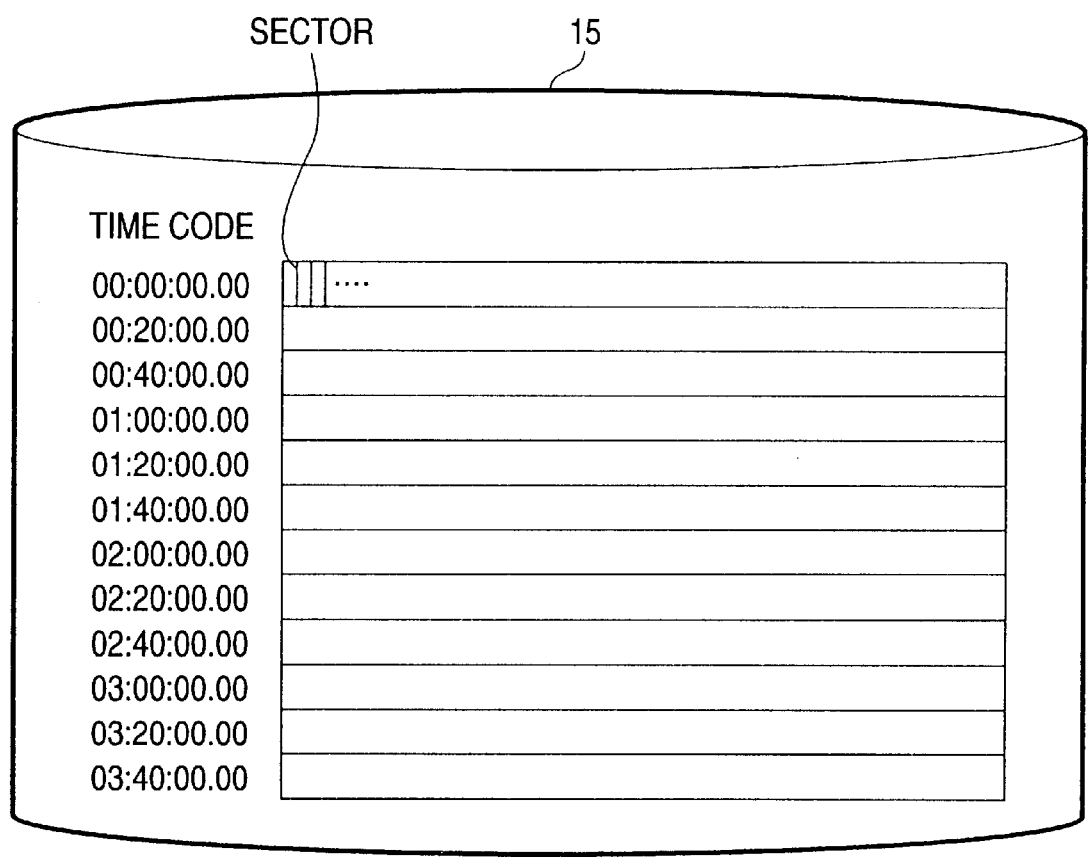
FIG. 7 is a view showing the state where time codes are made to correspond to sectors of a HD 15.

Next, for example, as shown in FIG. 7, a time code can be made to correspond to each sector of the HD 15 of FIG. 5. Incidentally, in FIG. 7, from the head sector, for example, SMPTE (Society of Motion Picture and Television Engineers) time code is sequentially made to correspond from 00:0:00:00 (hour:minute:second:frame). This time code corresponds to the case where AV data are recorded in the HD 15 at a constant compression rate.

As described above, in the case where the time code is made to correspond to the sector, in the AV server system, as described above, recording or reproduction of AV data can be made to start from the sector where the magnetic head 14A is positioned, and further, the position where recording or reproduction of AV data starts is specified with the time code, and the recording or reproduction can be made to start from that position.

Figure 8:
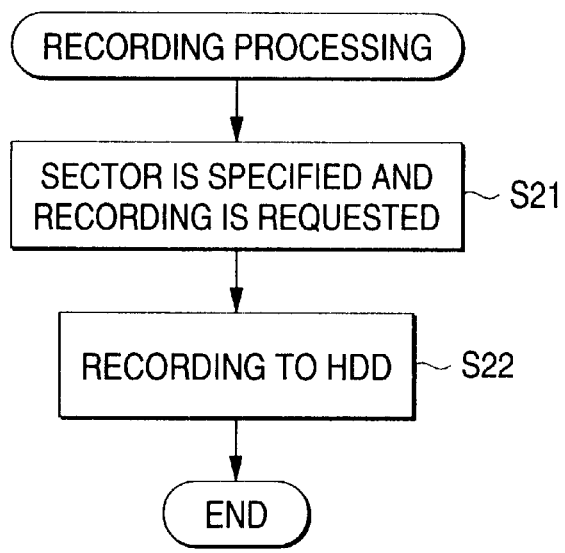
FIG. 8 is a flowchart for explaining the record processing aimed at the HD 15 where time codes are made to correspond to sectors.

That is, FIG. 8 shows a flowchart for explaining the record processing in which a record start position of AV data is specified with the tire code and the recording starts.

The user first operates the upper application 1 to input a time code where recording of AV data starts. When the time code is inputted, the upper application 1 calculates a sector (or cluster) of the HD 15 corresponding to the time code.

The upper application 1 specifies the calculated sector at step S21, and requests the TOP 13i to make a record from that sector.

In the IOP 13i, at step S22, the AV data are continuously recorded from the sector which is requested by the upper application 1 and the record processing is ended.

Next, reproduction processing in which a reproduction start position of AV data is specified with the time code and reproduction is started, will be described with reference to a flowchart of FIG. 9.

In this case, the user first operates the upper application 1 to input the time code where the reproduction of the AV data is started. When the time code is inputted, the upper application 1 calculates a sector (or cluster) of the HD 15 corresponding to the time code.

The upper application 1 specifies the calculated sector at step S31, and requests the IOP 13i to make reproduction from that sector (to cue up the sector).

In the TOP 13i, at step S32, the AV data are continuously read out (reproduced) from the sector requested by the upper application 1, and the processing proceeds to step S33, the readout AV data are outputted, and the reproduction processing is ended.

Figure 3:
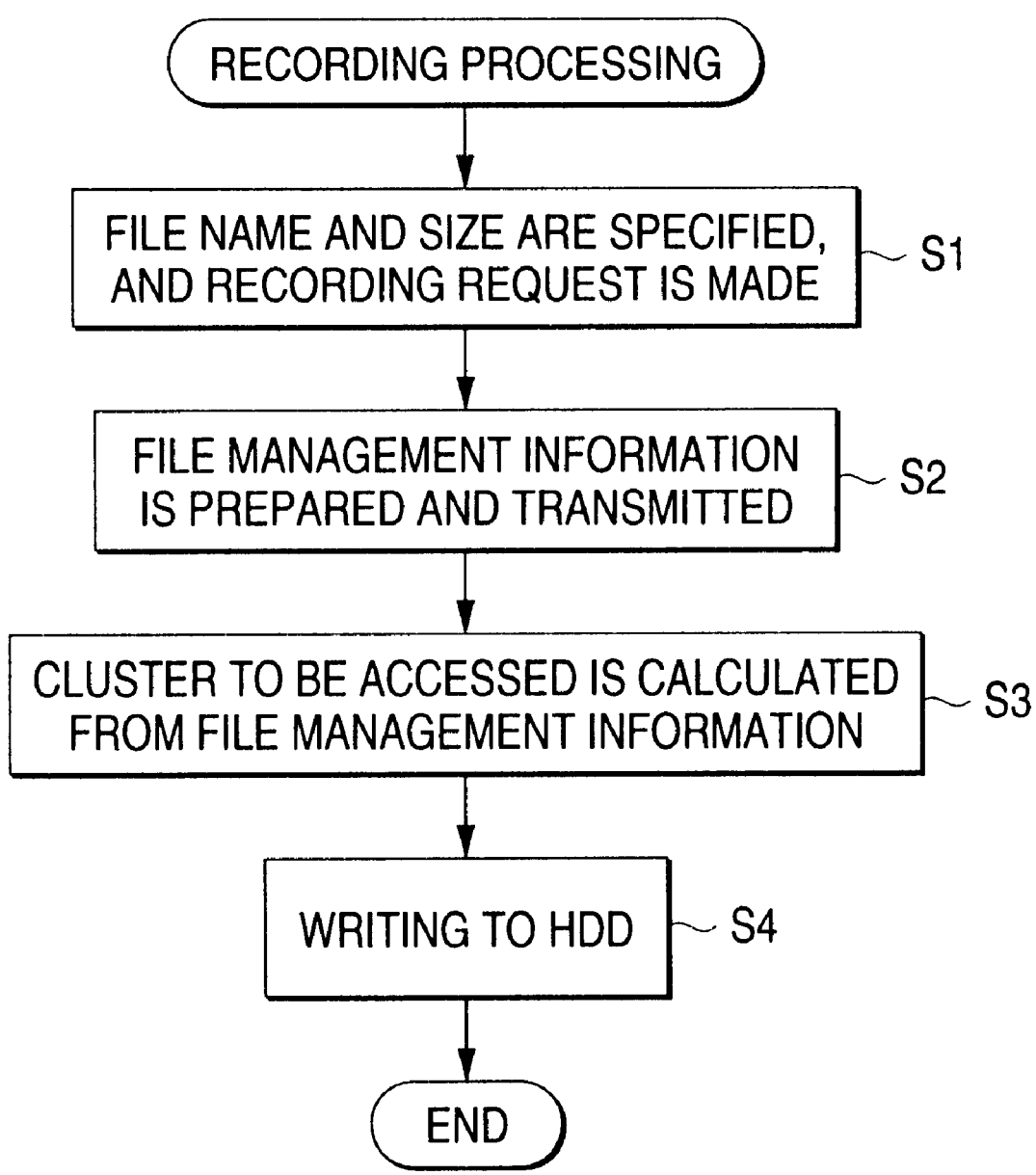
FIG. 3 is a flowchart for explaining the record processing of the AV server system of FIG. 1.
Figure 4:
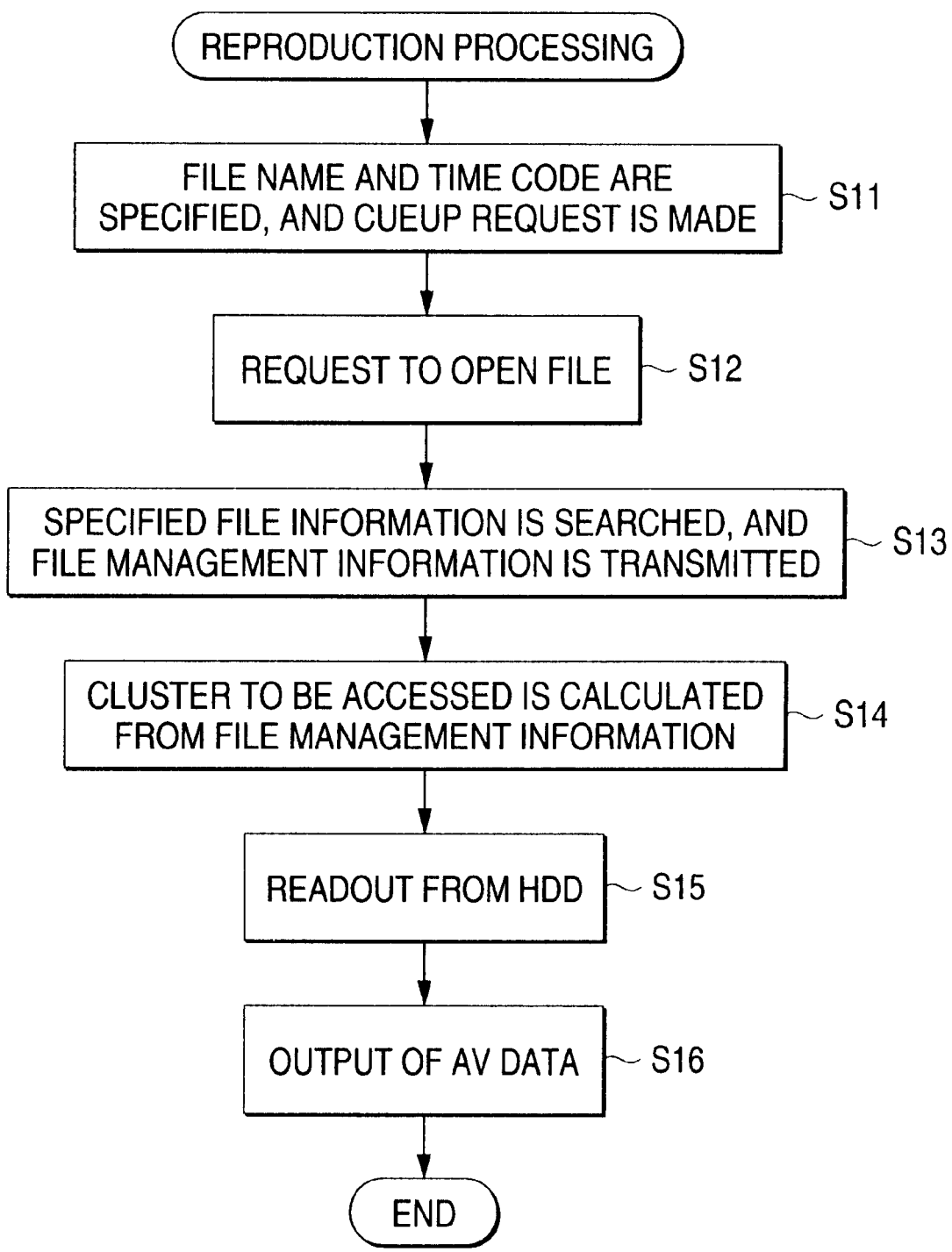
FIG. 4 is a flowchart for explaining the reproduction processing of the AV server system of FIG. 1.
Figure 9:
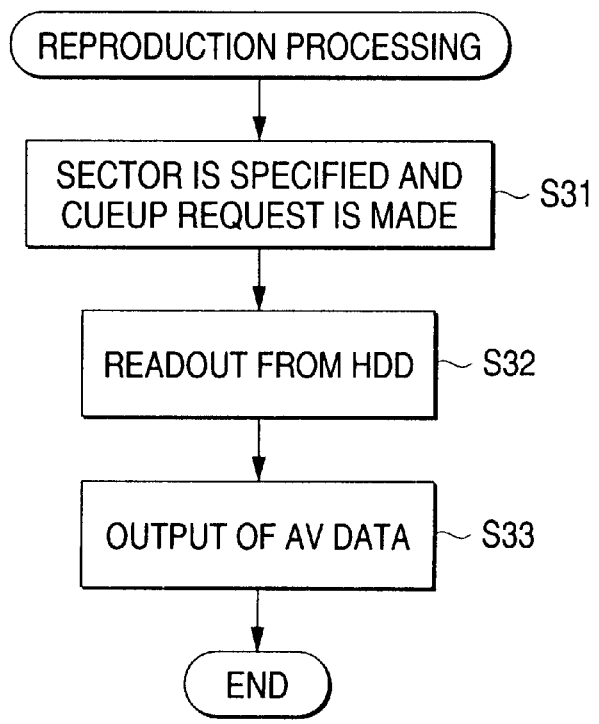
FIG. 9 is a flowchart for explaining the reproduction processing aimed at the HD 15 where time codes are made to correspond to sectors.

As is understood from comparison between the record processing explained in FIG. 3 and FIG. 8, or the reproduction processing explained in FIG. 4 and FIG. 9, in the AV server 2, when the file system is removed, and recording or reproduction of AV data is continuously performed from a specified position of a recording medium, it becomes possible to perform the recording or reproduction with a small number of steps.

Moreover, since the processing of recording or reproduction of AV data is simple as shown in FIG. 8 or FIG. 9, it becomes possible to meet various needs by expanding the upper application 1. That is, it is possible to easily perform the expansion of the upper application 1 to meet needs of the user.

Incidentally, in the foregoing case, although the user specifies the position, where reproduction or recording starts, through the time code, this position can be specified with the cluster number, sector address, or the like of the HD. In this case, in the upper application 1, it becomes unnecessary to calculate the corresponding sector from the time code. However, in view of operationality, it is desirable that in the upper application 1, the corresponding sector is calculated from the time code, and the user can specify the position where reproduction or recording starts, through the time code.

Next, as shown in FIG. 7, in the case where each sector of the HD 15 and the time code are previously made to correspond to each other, as described above, it is premised that recording of AV data to the HD 15 is performed at a predetermined constant compression rate. However, if the correspondence of the sector to the time code is made, for example, as described below, it becomes possible to deal with multiple rates where recording of AV data is performed at different compression rates.

That is, with respect to the HD 15, as shown in FIG. 10A, for example, the same cluster as in the case of FIG. 2A is constructed, and a head sector of each cluster is made a header, and remaining sectors are made a data recording area where AV data are recorded. In this case, here, since 1 cluster is composed of 10 sectors, as shown in FIG. 10B, a head sector of each cluster becomes a header, and the subsequent nine sectors become data recording areas.

Then, as shown in FIG. 10C, the compression rate of AV data recorded in the data recording area of the cluster and the time code of the AV data recorded at the first of the data recording area are placed in the header of each cluster.

In this case, the time code of the AV data recorded at the head of the data recording area of the cluster can be recognized by referring to the time code placed at the header of the cluster. Further, it is possible to recognize how many sectors of the data recording area of the cluster form the AV data of one frame, by referring to the compression rate placed in the header of the cluster. Further, the time code of the frame of the AV data recorded in the data recording area of the cluster can be obtained by referring to the time code and the compression rate placed in the header of the cluster.

Specifically, for example, in FIGS. 10A to 10C, a cluster #1103 is composed of a sector D0 as a header and sectors D1 to D9 as data recording areas. Now, in the case where 3 sector/frame is placed as the compression rate and 00:35:23:01 is placed as the time code in the sector D0 as the header, from the compression rate of 3 sector/frame in the header, 1 frame is composed of AV data recorded in 3 sectors of the sectors D1 to D3, the sectors D4 to D6, or the sectors D7 to D9. Further, from the time code of 00;35:23:01 in the header, the time code of the frame of the AV data recorded in the sectors D1 to D3 becomes 00:35:23:01, the time code of the frame of the AV data recorded in the sectors D4 to D6 becomes 00:35:23:02, and the time code of the frame of the AV data recorded in the sectors D7 to D9 becomes 00:35:23:03.

Incidentally, as described above, in the case where a head sector of a cluster is made a header, and a compression rate is placed there, it becomes possible to change a compression rate in cluster units.

Next, record processing in which recording as described in FIGS. 10A to 10C is carried out, will be described with reference to a flowchart of FIG. 11. Here, it is assumed that together with AV data to be recorded, a time code accompanying that is inputted to the IOP 13$i$.

The user first operates the upper application 1 to start recording of the AV data, for example, to input the cluster number of a cluster. When the cluster number is inputted, at step S41, the upper application 1 requests the IOP 13$i$ to make a record from the cluster of the cluster number.

In the IOP 13$i$, at step S42, the AV data inputted together with the time code are compressed to compressed data at a predetermined compression rate, and the processing proceeds to step S43. The compressed data, the time code, and the compression rate, together with the command to instruct recording from the cluster of the cluster number requested by the upper application 1, are outputted to the HDD 14. By this, in the HDD 14, at step S44, the time code and the compression rate are recorded in the head sector as the header of the cluster of the requested cluster number, and the compressed data are recorded in the subsequent sectors.

The processing proceeds to step S45, and it is judged whether AV data to be recorded are ended. In the case where it is judged that the AV data are not ended, the processing returns to step S42, and similar processing is subsequently repeated for the next AV data.

At step S45, in the case where it is judged that the AV data to be recorded are ended, the record processing is ended.

Figure 11:
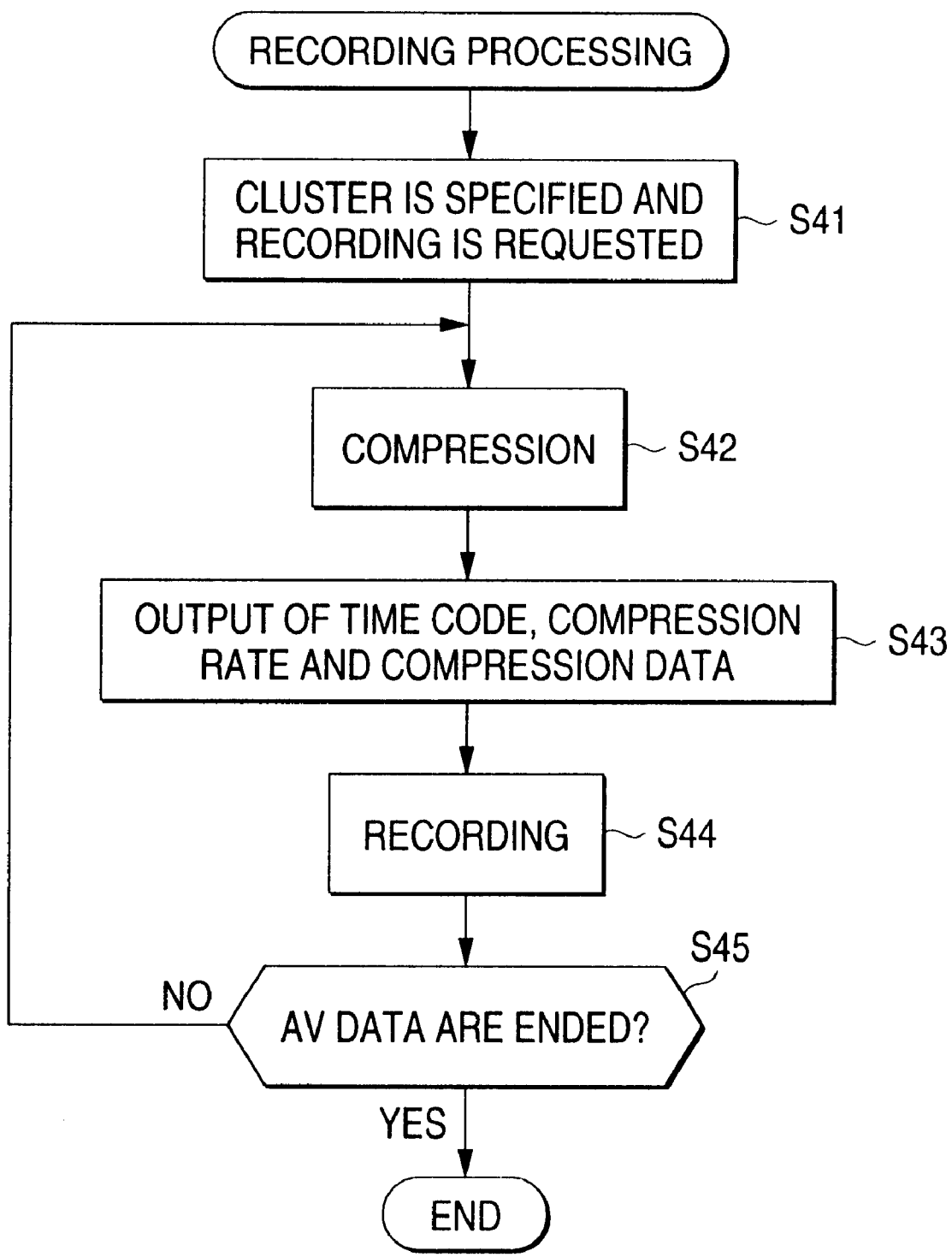
FIG. 11 is a flowchart for explaining the record processing in the case where recording of AV data is performed at multiple rates.
Figure 12:
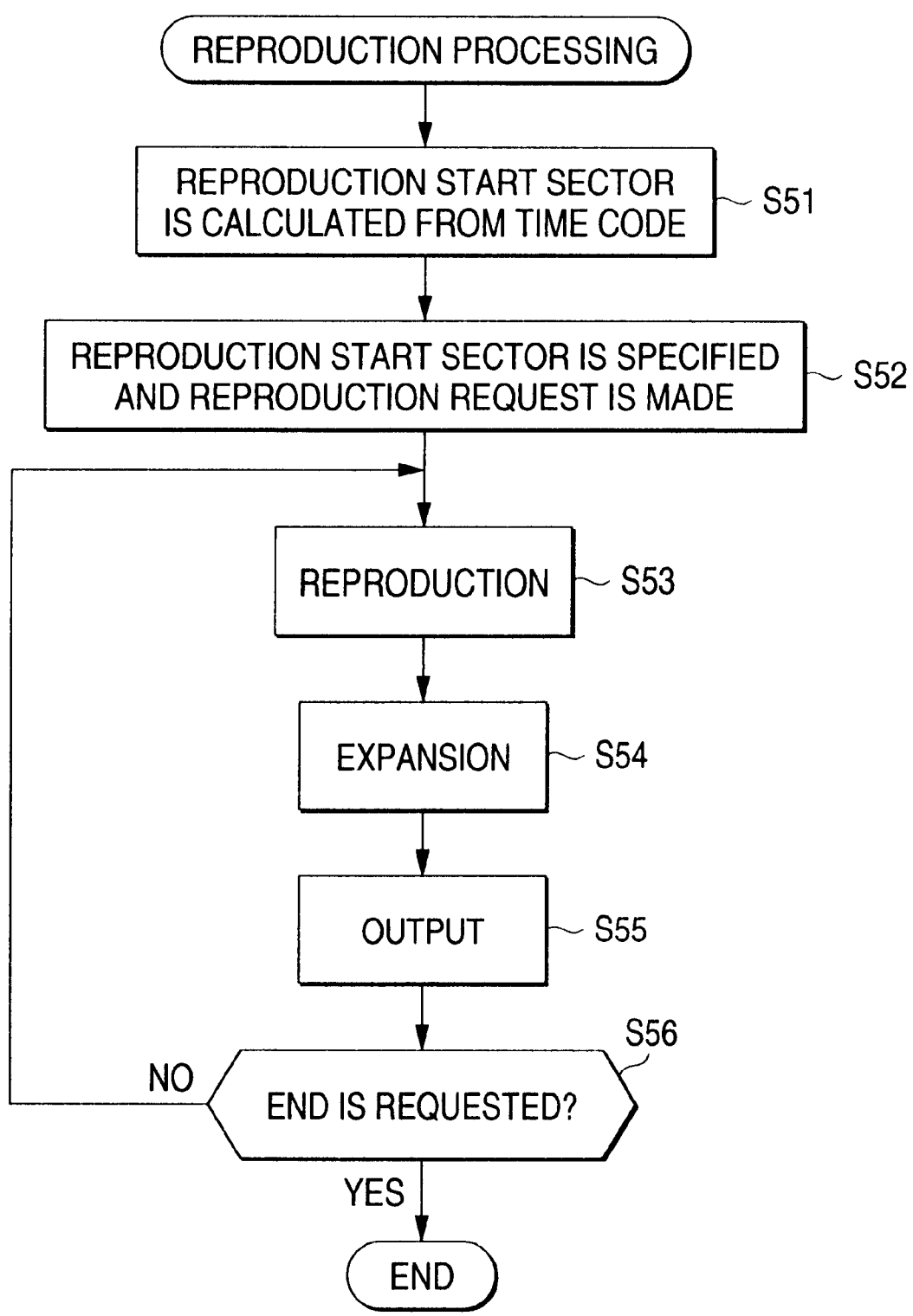
FIG. 12 is a flowchart for explaining the reproduction processing in the case where AV data recorded at multiple rates are reproduced.

Next, reproduction processing in which the AV data recorded as explained in FIG. 11 is reproduced, will be described with reference to a flowchart of FIG. 12.

In this case, the user first operates the upper application 1 to start reproduction of AV data, for example, by inputting a time code. When the time code is inputted, at step S51, the upper application 1 calculates a sector of the HD 15 corresponding to the time code. That is, for example, the upper application 1 controls the IOP 13$i$ to reproduce a time code and a compression rate placed in a head sector of a cluster, and on the basis of the time code and the compression rate, the upper application calculates the head sector where the frame of the time code inputted from the user is recorded.

At step S52, the upper application 1 specifies the calculated sector, and requests the IOP 13$i$ to make reproduction from the sector (to cue up the sector).

In the IOP 13$i$, at step S53, compressed data are continuously read out (reproduced) from the sector requested by the upper application 1, and then, the processing proceeds to step S54, and the readout compressed data are expanded to the original AV data. At step S55, the IOP 13$i$ outputs the expanded AV data, and the processing proceed to step S56. At step S56, it is judged whether the upper application 1 is operated by the user so as to end the reproduction. In the case where it is judged that such operation is not made, the processing returns to step S53, and similar processing is thereafter repeated for compressed data recorded subsequently to the last readout compressed data.

At step S56, in the case where it is judged that the upper application 1 is operated so as to end the reproduction, the reproduction processing is ended.

As described above, since the recording area of the HD 15 is regarded as a linear recording area like one video tape, and recording or reproduction of AV data is continuously performed for such a recording area, the user can make the operation in the same feeling as the operation of a VTR.

Further, as a result, the file system can be removed, so that it becomes possible to simplify the software for operating the AV server 2, to miniaturize the scale of the apparatus, and to reduce costs. Besides, since there is no file system, there does not also occur a trouble due to the loss of the file system.

Incidentally, even if the file system 2 is removed in the AV server 2 and recording or reproduction of AV data to the HD 15 is made to be continuously performed, it is possible to make the AV server 2 function as a multichannel AV server 2. That is, for example, it is possible to design such that recording of AV data is performed in a certain IOP among the IOPs 131 to 134, and the AV data immediately after recording are reproduced in the other IOP.

Besides, in this embodiment, although the description has been made on the recording and reproduction of the AV data, the invention can also be applied to the case where data other than the AV data are recorded or reproduced.

Moreover, in this embodiment, although the HD is used as a random-accessible recording medium, as the random-accessible recording medium other than that, for example, a disk-shaped medium such as a magneto-optical disk, or a semiconductor memory such as a flash memory can also be used.

Besides, in the AV server 2 of FIG. 5, the recording area of the HD 15 is regarded as a linear recording area such as one video tape, and recording or reproduction of AV data is continuously performed for such a recording area. However, since the HD 15 is a random-accessible recording medium, in the case where a record start position or reproduction start position is specified, recording or reproduction from such a position can be quickly started.

As described above, according to the recording apparatus and recording method of the invention, since the recording means are controlled so that data are continuously recorded from the place where the recording means for recording data on the random-accessible recording medium is positioned, it becomes possible to provide the recording apparatus with high operationality for a simple use.

Moreover, according to the reproducing apparatus and reproducing method of the invention, since the reproducing means are controlled so that data are continuously reproduced from the place where the reproducing means for reproducing data recorded on the random-accessible recording medium is positioned, it becomes possible to provide the reproducing apparatus with high operationality for a simple use.

What is claimed is:

1. A data recording apparatus for recording data on a random-accessible recording medium, comprising:
   recording means for recording the data on the recording medium, wherein the recording medium includes at least one recording area and the recording area includes a data recording area and a header; and
   control means for controlling the recording means so that the data are continuously recorded in the data recording area on the recording medium.

2. A data recording apparatus according to claim 1, wherein the recording medium further comprises a record start position of the data is specified, and wherein the control means causes the data to be continuously recorded from the record start position.

3. A data recording apparatus according to claim 2, wherein a time code is made to correspond to the recording area of the recording medium in predetermined units, and
   the record start position of the data is specified with the time code.

4. A data recording apparatus according to claim 1, further comprising compression means for compressing the data and for outputting compressed data, wherein the recording means records the compressed data in the data recording area and the compression rate in the header of the recording area.

5. A data recording apparatus according to claim 4, wherein a time code corresponding to the data is inputted, and wherein
   the recording means records the compressed data in the data recording area, and the recording means records the time code corresponding to the compressed data in the header.

6. A data recording apparatus according to claim 1, wherein the recording means further comprises reproducing means to reproduce the data on the recording medium; and
   the control means further controls the recording means so that the data are continuously reproduced in the recording area on the recording medium.

7. A data recording apparatus according to claim 6, wherein the recording medium further comprises a reproduction start position, the control means causes the data to be continuously reproduced from the reproduction start position.

8. A data recording apparatus according to claim 7, wherein a time code corresponding to the recording area of the recording medium in predetermined units is determined, and the reproduction start position of the data is determined from the time code.

9. A data recording apparatus according to claim 7, wherein the data are compressed at a compression rate to form compressed data and are recorded in the data recording area on the recording medium, wherein a time code corresponding to the data is inputted, wherein the time code and the compression rate are recorded in the header, and wherein the reproducing means reproduces the time code and the compression rate.

10. A data recording apparatus for recording externally inputted data, comprising:
    a plurality of random-accessible recording media;
    recording means for recording the data on the recording media, wherein the recording media includes at least one recording area and the recording area includes a data recording area and a header;
    a plurality of input/output means for outputting the externally inputted data to the recording means, wherein the input/output means accesses the recording means on a time-sharing basis; and
    control means for controlling the recording means so that the data are continuously recorded in the data recording area on the recording media and a compression rate of the data and a time code are recorded, in predetermined units, in the header.

11. A recording/reproducing apparatus for recording/reproducing externally inputted data, comprising:
    a plurality of random-accessible recording media, wherein the recording media includes at least one recording area and the recording area includes a data recording area and a header;

recording/reproducing means for recording the data on the recording media and for reproducing the data recorded on the recording media;

a plurality of input/output means for outputting the externally inputted data to the recording/reproducing means, wherein the input/output means accesses the recording/reproducing means on a time-sharing basis and for outputting the data outputted from the recording/reproducing means to the outside; and control means for controlling the recording/reproducing means so that the data are continuously recorded in the data recording area on the recording media and a compression rate of the data and a time code are recorded, in predetermined units, in the header, and for controlling the recording/reproducing means so that the data recorded on the recording media are reproduced from the data recording area when a reproduction control signal including a location of the recording area or the time code is inputted from an upper terminal.

12. A data recording method for recording externally inputted data on a random-accessible recording medium, comprising:

a first step of outputting the externally inputted data during an allotted time slot period to recording means for recording the data on the recording medium, wherein the recording medium includes at least one recording area and the recording area includes a data recording area and a header; and a second step of continuously recording the data inputted to the recording means at the first step in the data recording area on the recording medium and recording a time code and a compression rate of the data in the header.

13. A data recording/reproducing method for recording externally inputted data on a random-accessible recording medium and for reproducing the data recorded on the recording medium, comprising:

a first step of outputting the externally inputted data during an allotted time slot period to recording/reproducing means for recording the data on the recording medium, wherein the recording medium includes at least one recording area and the recording area includes a data recording area and a header;

a second step of continuously recording the data inputted to the recording/reproducing means at the first step in the data recording area on the recording medium, and recording a time code and a compression rate of the data in the header;

a third step of continuously reproducing the data recorded on the recording medium from the data recording area and outputting the reproduced data during the time slot period when a reproduction control signal including a location of the recording area or the time code is inputted from an upper terminal; and a fourth step of outputting the data outputted at the third step to the outside.

14. A data reproducing apparatus for reproducing externally inputted data recorded on a random-accessible recording medium, comprising:

reproducing means for reproducing the data recorded on the recording medium, wherein the recording medium includes at least one recording area and the recording area includes a data recording area and a header; and control means for controlling the reproducing means so that the data in the data recording area on the recording medium are continuously reproduced.

15. A data reproducing apparatus according to claim 14, wherein the recording medium further comprises a reproduction start position and wherein the control means moves the reproducing means to the reproduction start position and causes the data to be continuously reproduced from the reproduction start position.

16. A data reproducing apparatus according to claim 15, wherein a time code is made to correspond to the recording area on the recording medium in predetermined units, and the reproduction start position of the data is specified with the time code.

17. A data reproducing apparatus according to claim 15, wherein the data are compressed at a compression rate to form compressed data and are recorded in the data recording area on the recording medium, a time code is inputted and the time code corresponding to the compressed data and the compression rate are recorded in the header.

18. A data reproducing method for reproducing data recorded on a random-accessible recording medium, wherein the recording media includes at least one recording area and the recording area includes a data recording area and a header, said reproducing method comprising:

a first step of inputting a reproduction control signal including a location of the recording area where the data to be reproduced is recorded or a time code from an upper terminal;

a second step of continuously reproducing the data recorded on the recording medium from the data recording area identified by the location or the time code when the reproduction control signal of the first step is inputted;

a third step of outputting the data reproduced at the second step during an allotted time slot period; and a fourth step of outputting the data reproduced at the third step to the outside.

19. A data reproducing method according to claim 18, wherein a compression rate of the data is further recorded on the recording medium in the header, and the time code and the compression rate, together with the data, are reproduced at the second step.

* * * * *